PULSE GENERATOR

Filed May 17, 1956

INVENTORS
ROBERT W. HUGHES
ROBERT L. PLOUFFE, JR.
BY HENRY T. PERETKO
Alfred C. Hill
AGENT United States Patent Office 2,829,282 Patented Apr. 1, 1958

2,829,282

PULSE GENERATOR

Robert W. Hughes, Mountain Lakes, Robert L. Plouffe, Jr., Livingston, and Henry T. Peretko, Dover, N. J., assignors to International Telephone and Telegraph Corporation, Nutley, N. J., a corporation of Maryland Application May 17, 1956, Serial No. 585,529

9 Claims. (Cl. 307—107)

This invention relates to pulse generators and more particularly to a generator for producing moderately steep-sided square wave pulses from a sine wave source.

In certain multiplex communication systems, it is necessary to produce a square wave pulse, commonly referred to as a gate pulse, to cooperate in the separation of channel signals from a received multiplex signal for demodulation to recover the intelligence carried by the channel signals. In the past, the generation of gate pulses has been carried out by circuits employing electron discharge devices and transistors.

Therefore, it is an object of this invention to provide a circuit for producing moderately steep-sided square wave pulses for employment as gate pulses from a sine wave source without the use of electron discharge devices or transistors.

Another object of this invention is to provide a pulse generator having simple circuitry for producing gate pulses from a sine wave source.

A feature of this invention is the provision of a pulse generator including a sine wave signal source, an inductive element in series relation with the sine wave signal and a means having a given voltage clipping function coupled to the inductive element and in shunt relation to the sine wave signal. The inductive element and the means exhibiting a given voltage clipping function cooperate to produce in response to a sine wave cycle a moderately steep-sided square wave gate pulse across said means, the time of occurrence of the leading edge of said square wave being a function of the value of said inductive element and the value of a resistance in series relationship with said inductive element.

Another feature of this invention is the provision of a silicon junction diode having a Zener voltage clipping function as the means exhibiting a given voltage clipping function.

Still another feature of this invention is the provision of two germanium diodes in parallel, one of which is biased in a given manner, said parallel diodes being employed as the means exhibiting a given voltage clipping function.

The above-mentioned and other features and objects of this invention will become more apparent by reference to the following description taken in conjunction with the accompanying drawings, in which.

Figure 1:
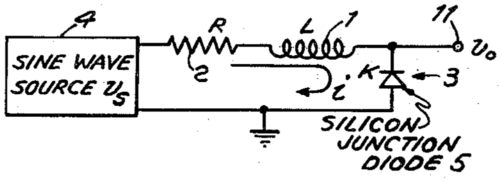
Fig. 1 illustrates schematically the pulse generator of this invention.
Figure 4:
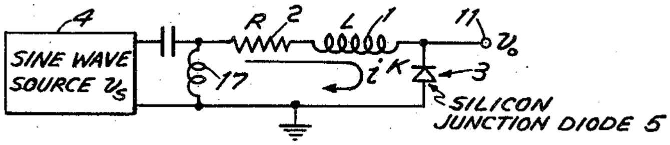
Fig. 4 illustrates schematically a variation of the pulse generator of Fig. 1.
Figure 5:
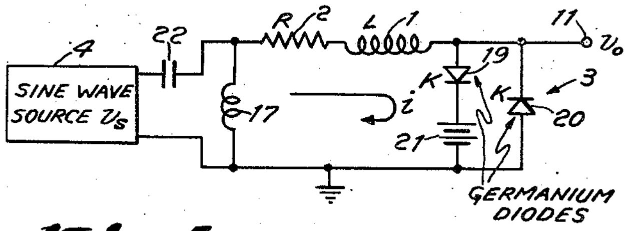
Fig. 5 illustrates schematically another embodiment following the principles of the pulse generator of this invention.

Referring to Figs. 1, 4 and 5, the pulse generator of this invention comprises an inductive element 1 in series with a resistor 2 and a means 3 having a given voltage clipping function. The element 1 and resistor 2 are in series-coupled relation with the sine wave of source 4, and means 3 is in shunt-coupled relation with the sine wave of source 4. Inductive element 1 may consist of a toroidal inductor while resistor 2, shown to be a separate component, may actually be the resistance of the inductive element 1, or the resistance of source 4, or a combination of both.

Figure 3:
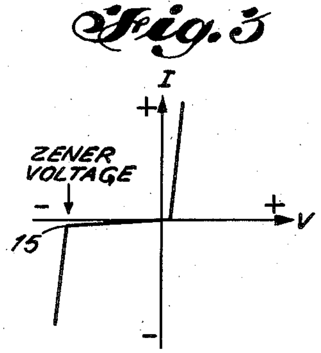
Figs. 2 and 3 are curves useful in explaining the operation of the pulse generator of this invention.
Figure 2:
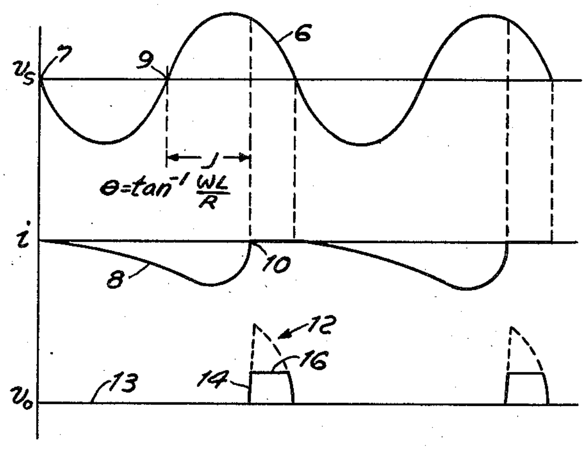

Referring more specifically to Fig. 1, means 3 is illustrated as being a silicon junction diode 5 having its cathode coupled to inductive element 1 and its anode coupled to a reference potential illustrated to be ground. The generation of the gate pulse is accomplished as follows. A sine wave from source 4 is coupled to the circuit of this invention and is illustrated by curve 6 of Fig. 2. During the negative cycle of curve 6, diode 5 is conductive, and, thus, current flows in this circuit. The current wave form is illustrated by curve 8 of Fig. 2. As illustrated, the inductive element 1 and resistor 2 provide a time constant, aid the current flow increases in a negative direction. It will be obvious from observing curves 6 and 8 that there is a phase difference between the cross over point 9 and the time at which current stops flowing through the diode, point 10 on curve 8. Thus, there is a phase shift between the input voltage and the current flowing in the circuit due to the action of the inductive element 1. The amount of phase shift is a function of the inductance of element 1 and the resistance of resistor 2. During the time that current is flowing through diode 5, diode 5 exhibits a very low impedance, and, thus, there will be substantially no voltage output developed across diode 5 to appear at terminal 11, as illustrated in curve 12 of Fig. 2 by portion 13. When the current reaches point 10 of curve 8, the diode switches to non-conduction and the resistance thereof increases relatively rapidly and, thus, a voltage will be developed at terminal 11 as indicated by portion 14 of curve 12. This will make the anode negative with respect to the cathode of diode 5; and when the voltage of portion 14 of curve 12 reaches a given value, diode 5 will conduct in the reverse direction rather heavily. The value at which diode 5 conducts heavily in the reverse direction is commonly referred to as the Zener voltage and is illustrated at point 15 of Fig. 3. This heavy conduction in the reverse direction through diode 5 causes the flat top 16 of the gate or square wave pulse of curve 12. It is rather obvious that the leading edge of the gate pulse is determined by the amount of phase shift between the voltage of curve 6 and the current of curve 8 and is a function of the value of the inductive element 1 and resistor 2. Since the trailing edge of the gate pulse is determined by the slope of the sine wave voltage of curve 6, it is possible to control the width of the gate pulse by selecting or adjusting the value of inductive element 1 and resistor 2 to adjust the phase shift exhibited in the circuit.

The circuit of Fig. 4 is substantially identical with that of Fig. 1 but is adapted for capacitor-coupled feed from the sine wave source 4 to the gate generator of this invention. As long as a shunt inductor 17 presents an impedance that is high relative to inductive element 1, then the value of inductor 17 is uncritical.

The Zener voltage breakdown of the silicon junction diode 5 develops considerable noise, and, thus, the gate generator of this invention was modified in a manner to substantially eliminate this Zener breakdown noise. This is illustrated in Fig. 5 where the gate generator consists of an inductive element 1 in series with a resistor 2 and means 3 including diodes 19 and 20 in parallel. Diode 20 has its cathode connected to element 1 and its anode connected to ground. Diode 19 has its anode connected to element 1 and its cathode connected to a battery 21 to act as a source of given bias potential. Capacitor 22 provides D.-C. isolation between the low-impedance sine wave source and the gate generator, and the inductor 17 produces a D.-C. path to ground without A.-C. loading. The gate generation of this circuit is accomplished as follows. During the negative cycle of sine wave 6 of Fig. 2, diode 20 conducts. It remains conducting until the current passing through in the forward direction of the diode drops to zero. The time at which the current goes to zero is determined by the element 1 and resistor 2 and occurs before the positive cycle of the sine wave 6 crosses the zero axis. At this time, diode 20 switches from a low forward resistance to a high back resistance. At the time of switching, there is a voltage across element 20 which is equal to the sine wave source voltage at that time. Inductor 17 will have very little effect since it is shunted by a low-impedance source 4. After diode 20 switches, the voltage at the junction of diodes 19 and 20, or, in other words, at terminal 11, will be equal to the sine wave voltage. When the positive pulse reaches the given potential established by battery 21, diode 19 conducts to clip the voltage which would normally appear across diode 20. This provides the pulse of curve 12, Fig. 2. It is to be noted that diode 19 acts the same as the Zener voltage breakdown of silicon junction diode 5 described in connection with Figs. 1 and 4.

To produce gate or square wave pulses having moderately steep leading and trailing edges with sufficient amplitude, it is necessary to employ a relatively large sine wave input. For instance, if it is desired to have a 25-volt amplitude gate pulse, it is necessary to provide a 100-volt peak-to-peak sine wave input. In certain applications, this large an input voltage may be undesirable. It has further been discovered that if there is a one percent error in phase shift due to component variation there results an error of approximately five percent in the width of the produced gate or square wave pulse. Certain equipment specifications cannot stand such an error, but there are equally as many equipment specifications that can tolerate this error in pulse width. Furthermore, with the present techniques employed by component manufacturers, it is conceivable that the error in phase shift can be held to very close tolerances, and, thus, the pulse width will not undesirably vary due to variations in component values.

While we have described above the principles of our invention in connection with specific apparatus, it is to be clearly understood that this description is made only by way of example and not as limitation to the scope of our invention as set forth in the objects thereof and in the accompanying claims.

We claim:

1. A pulse generator comprising a source of sine wave signals, an inductive phase shift element coupled in series relation with said source and a means having a Zener voltage clipping function coupled to said phase shift element and disposed in shunt relation to said source, said phase shift element and said means cooperating to produce in response to a sine wave cycle a moderately steep-sided square wave pulse across said means.

2. A pulse generator comprising a source of sine wave signals, an inductive time constant circuit coupled in series relation with said source and a circuit means including at least one diode having a given voltage clipping function coupled to said time constant circuit and disposed in shunt relation to said source, said time constant circuit and said circuit means cooperating to produce in response to the negative portion of a sine wave cycle a moderately steep-sided positive square wave pulse across said circuit means.

3. A pulse generator comprising a source of sine wave signals, an inductive element coupled in series relation with said source and a circuit means including at least one diode having a Zener voltage clipping function coupled to said inductive element and disposed in shunt relation to said source, said inductive element and said circuit means cooperating to produce in response to a sine wave cycle a moderately steep-sided square wave pulse across said circuit means.

4. A pulse generator comprising a source of sine wave signals, an inductive element coupled in series relation with said source and a means having a forward conduction condition and a reverse conduction condition coupled to said inductive element and disposed in shunt relation to said source, said inductive element and the reverse conduction condition of said means cooperating to produce in response to a sine wave cycle a moderately steep-sided square wave pulse across said means.

5. A pulse generator comprising a source of sine wave signals, an inductive element coupled in series relation with said source and a means having a forward conduction condition, a non-conduction condition and a reverse conduction condition coupled to said inductive element and disposed in shunt relation to said source to develop thereacross a moderately steep-sided square wave pulse, said inductive element producing a given phase shift between the zero crossover of the voltage of said source and the zero crossover of the current of the forward conduction condition of said means, said means switching to said non-conduction condition at the zero crossover of the forward current to produce the leading edge of said pulse and said means switching to said reverse conduction condition to produce the flat top of said pulse, said sine wave signal producing the trailing edge of said pulse.

6. A pulse generator comprising a source of sine wave signals, an inductive element coupled in series relation with said source and a silicon junction diode having a given reverse voltage clipping function coupled to said inductive element and disposed in shunt relation to said source, said inductive element and said diode cooperating to produce in response to a sine wave cycle a moderately steep-sided square wave pulse across said means.

7. A pulse generator comprising a source of sine wave signals, an inductor coupled in series relation with said source, a reference potential, a silicon junction diode having a given reverse voltage clipping function, means coupling the anode of said diode to said reference potential and means coupling the cathode of said diode to said inductor, said inductor and the reverse voltage clipping function of said diode cooperating to produce in response to a sine wave cycle a moderately steep-sided square wave pulse at the cathode of said diode.

8. A pulse generator comprising a source of sine wave signals, an inductive element coupled in series relation with said source and a circuit including a first germanium diode, a second germanium diode poled opposite to said first diode and parallel thereto and a bias voltage source coupled in series to said second diode to establish a given voltage clipping function, said circuit being coupled to said inductive element and disposed in shunt relation to said source, said inductive element and said diodes cooperating to produce in response to a sine wave cycle a moderately steep-sided square wave pulse across said means.

9. A pulse generator comprising a source of sine wave signals, an inductor coupled in series relation with said source, a reference potential, a first germanium diode, means coupling the cathode of said first diode to said inductor, means coupling the anode of said first diode to said reference potential, a second germanium diode, a bias source, means coupling the anode of said second diode to said inductor, means coupling the cathode of said diode to the positive side of said bias source and means coupling the negative side of said bias source to said reference potential, said second diode and said bias source providing a given reverse voltage clipping function for cooperation with said inductor to produce in response to a sine wave cycle a moderately steep-sided square wave pulse at the junction of said first and second diodes.

No references cited.